(No Model.)

E. E. CLIFT.
INSULATED PIPE COUPLING.

No. 514,304. Patented Feb. 6, 1894.

Witnesses.
P. D. Goodwin
A. V. Groups

Inventor:
Edmund E. Clift
by his Attorneys
Howson & Howson

THE NATIONAL LITHOGRAPHING COMPANY,
WASHINGTON, D. C.

UNITED STATES PATENT OFFICE.

EDMUND E. CLIFT, OF PHILADELPHIA, PENNSYLVANIA, ASSIGNOR TO JOHN F. POLE, OF SAME PLACE.

INSULATED PIPE-COUPLING.

SPECIFICATION forming part of Letters Patent No. 514,304, dated February 6, 1894.

Application filed October 10, 1892. Renewed August 9, 1893. Serial No. 482,750. (No model.)

*To all whom it may concern:*

Be it known that I, EDMUND E. CLIFT, a citizen of the United States, and a resident of Philadelphia, Pennsylvania, have invented a certain Improved Insulated Pipe-Coupling, of which the following is a specification.

The object of my invention is to construct a coupling for electroliers which can be used to couple a simple electric fixture to a drop, or couple a combined gas and electric fixture to the main gaspipe. This object I attain in the following manner, reference being had to the accompanying drawings, in which—

Figure 1:
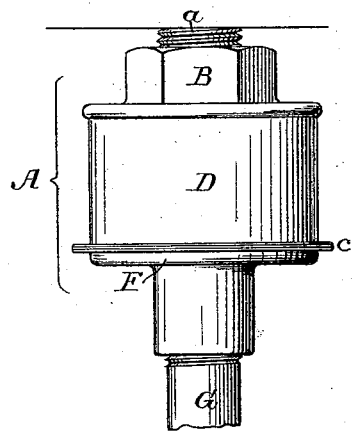
Figure 2:
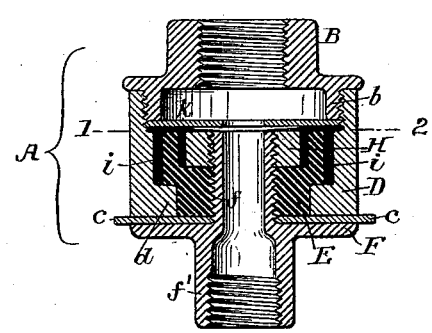
Figure 3:
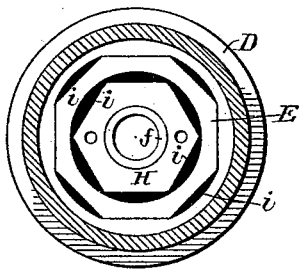
Figure 4:
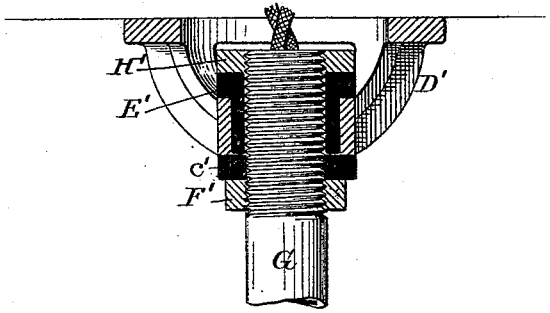

Figure 1, is a side view of my improved coupling. Fig. 2, is a sectional view. Fig. 3, is a sectional plan view on the line 1—2, Fig. 2; and Fig. 4, is a view of a modification of my invention.

$a$ is a pipe projecting from the ceiling and having a suitable screw thread to which is adapted a cap B of the coupling A. This cap has a screw threaded projection $b$ adapted to the body of the coupling D. This body, as will be noticed in Fig. 2, has an internal flange $d$ on which rests the non-conducting block E made preferably of vulcanized fiber, but it will be understood that it may be made of rubber or other non-conducting material. Passing through a central opening in this block E is the screw threaded stem $f$ of the bottom piece F, which is preferably the same diameter as the body D, and between this bottom piece and the body is a non-conducting plate $c$ preferably of mica. Depending from this bottom piece is a neck $f'$ having an internal screw thread to which is adapted the stem G of the electrolier or gas fixture.

Adapted to the screw threaded stem $f$ is a nut H which rests in the recess formed in the block E. This nut confines the bottom portion F and sustains the weight of the electrolier. The space between the nut and the block, and the space between the block and the main casing D of the electrolier, is filled with a cement $i$, which when set, is gas proof, preventing leakage when the device is used to support a combined fixture.

In applying the device, the block E is first set into the casing D, the bottom portion F placed in position, its stem passing through the block, the nut H is then screwed upon the stem locking the three parts together. The mica C being previously placed upon the bottom portion, the cement is then introduced into the crevices around the block, and in some instances I place a mica washer $k$ above the block on the nut as shown in Fig. 2, to prevent any accidental contact of the parts. The cap B is then screwed into the main casing D, and the neck $f$ is screwed upon the electrolier or gas fixture.

In applying the electrolier to the ceiling pipe, it may hang out of plumb, in which case it can be hung plumb by first heating the coupling sufficiently to allow the cement to soften, and after the fixture is in proper position the cement is allowed to cool, making a rigid connection between the parts, at the same time preventing the escape of gas if a combined fixture is used and making a perfect non-conducting coupling. The bottom piece F in fact, forms a continuation of the stem of the electrolier, and as will be seen in Fig. 4, the flanged portion of the bottom piece may be in the form of a nut adapted to the screw threads upon the stem of the electrolier, the said stem passing up through the block, but where the device is sold separate from the electrolier I prefer to make it as shown in Fig. 2, as it is more compact and can be readily applied to any of the electroliers now on the market.

In Fig. 4, I have shown a coupling modified slightly by making a spider D' secured to the ceiling in any manner and supporting the block E', the non-conducting material $c'$ being confined between the spider and the nut or bottom piece F', the stem G of the electrolier passing through the block and adapted to the upper portion of this stem is a nut H' insulated from the spider D' by the block E'.

I claim as my invention—

1. The combination of the casing D, a non-conducting block supported therein, a threaded stem to which may be attached an electrolier, a flange on said stem, the threaded portion of the stem passing through the block, a nut on the stem supported by the block, with a mica washer between the flange on the stem and the casing, said washer extending beyond the non-conducting block, substantially as described.

2. The combination in a coupling of the casing D, a block of non-conducting material therein, an electrolier, a threaded stem thereon extending up through the block, a nut on said stem resting in a recess in said block with cement between the walls of the recess and the nut and between the exterior of the block and the interior of the casing, substantially as specified.

3. The combination of the casing D, a stepped cavity therein, a block of non-conducting material adapted to said cavity and supported by the casing, a cap B adapted to the casing, and forming a coupling with the ceiling pipe, a stem adapted to an opening in the block of non-conducting material, a nut on said stem resting upon the block, an extended flange situated under the block, said flange forming part of or secured to the stem, with a mica or other non-combustible washer between the casing and non-conducting block and the extended flange of the stem, said washer extending beyond the edge of one of said parts, substantially as described.

In testimony whereof I have signed my name to this specification in the presence of two subscribing witnesses.

EDMUND E. CLIFT.

Witnesses:
H. F. REARDON,
HENRY HOWSON.